US008695279B2

United States Patent
Sato (10) Patent No.: US 8,695,279 B2
(45) Date of Patent: Apr. 15, 2014

(54) DOOR FRAME STRUCTURE FOR PREVENTING ENTRY OF FOREIGN OBJECTS

(75) Inventor: Eisuke Sato, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 86 days.

(21) Appl. No.: 13/432,655

(22) Filed: Mar. 28, 2012

(65) Prior Publication Data

US 2012/0247026 A1 Oct. 4, 2012

Related U.S. Application Data

(60) Provisional application No. 61/533,432, filed on Sep. 12, 2011.

(30) Foreign Application Priority Data

Mar. 31, 2011 (JP) .................................. 2011-078642
Jan. 20, 2012 (WO) .................. PCT/JP2012/051206

(51) Int. Cl.
*E06B 7/26* (2006.01)

(52) U.S. Cl.
USPC ....... 49/489.1; 49/475.1; 49/476.1; 49/479.1; 49/480.1; 49/483.1; 49/484.1; 49/490.1; 49/441

(58) Field of Classification Search
USPC ............ 49/475.1, 476.1, 479.1, 480.1, 483.1, 49/484.1, 489.1, 440, 441, 502, 482.1, 49/495.1
See application file for complete search history.

(56) References Cited

U.S. PATENT DOCUMENTS

| | | | | |
|---|---|---|---|---|
| 4,875,307 A | * | 10/1989 | Barbero | 49/374 |
| 5,038,521 A | * | 8/1991 | Andrzejewski et al. | 49/441 |
| 6,070,363 A | * | 6/2000 | Vance | 49/377 |
| 6,679,003 B2 | * | 1/2004 | Nozaki et al. | 49/441 |
| 7,762,021 B2 | * | 7/2010 | Fujiwara et al. | 49/502 |
| 2002/0027378 A1 | * | 3/2002 | Nozaki | 296/146.9 |

(Continued)

FOREIGN PATENT DOCUMENTS

| | | |
|---|---|---|
| JP | 56-102719 U | 8/1981 |
| JP | 2002-274187 A | 9/2002 |

(Continued)

OTHER PUBLICATIONS

International Search Report mailed on May 1, 2012 by the International Searching Authority for International Application No. PCT/JP2012/051206, and English translation of the International Search Report. (5 pages).

*Primary Examiner* — Katherine Mitchell
*Assistant Examiner* — Marcus Menezes
(74) *Attorney, Agent, or Firm* — Buchanan Ingersoll & Rooney PC (57) ABSTRACT

Provided is a door frame assembly that enables a molding portion to be bent with ease and in which end portions of a door frame do not rust due to the entry of raindrops or the like. A second end portion B that follows on a second flange portion of a door frame is located between an inner wall portion of a glass run channel and a portion of a main frame portion that faces the inner wall portion. An engagement portion of the molding portion is partially connected to a third side wall portion at multiple locations along the direction in which a vertical door frame assembly extends.

8 Claims, 6 Drawing Sheets

(56) References Cited

U.S. PATENT DOCUMENTS

| | | | |
|---|---|---|---|
| 2004/0088925 A1* | 5/2004 | Nozaki | 49/498.1 |
| 2006/0042170 A1* | 3/2006 | Furuzawa et al. | 49/489.1 |
| 2008/0116713 A1* | 5/2008 | Jun et al. | 296/146.2 |
| 2008/0178531 A1* | 7/2008 | Takeuchi et al. | 49/475.1 |
| 2009/0295194 A1* | 12/2009 | Takeuchi et al. | 296/202 |
| 2011/0099911 A1 | 5/2011 | Ellis et al. | |
| 2013/0219799 A1 | 8/2013 | Takeuchi et al. | |

FOREIGN PATENT DOCUMENTS

| | | |
|---|---|---|
| JP | 2006-051906 A | 2/2006 |
| JP | 2010-018130 A | 1/2010 |
| WO | 2009/124382 A1 | 10/2009 |

\* cited by examiner

VEHICLE OUTSIDE ↑ ↓ VEHICLE INSIDE

FIG.11
Prior Art

VEHICLE OUTSIDE ←→ VEHICLE INSIDE

DOOR FRAME STRUCTURE FOR PREVENTING ENTRY OF FOREIGN OBJECTS

CROSS REFERENCE TO RELATED APPLICATION

This application is based on and claims priority under 35 U.S.C §119 to Japanese Patent Application No. 2011-78642 filed on Mar. 31, 2011, to International Patent Application No. PCT/JP2012/051206 filed on Jan. 31, 2012, and to U.S. Provisional Application No. 61/533,432 filed on Sep. 12, 2011, the entire content of which is incorporated herein by reference.

TECHNICAL FIELD

This disclosure relates to a door frame assembly including a door frame that configures a window frame of a vehicle door, a molding portion attached to the door frame, and a glass run channel.

BACKGROUND DISCUSSION

A door frame assembly including a vehicle door frame, a molding portion attached to the door frame, and a glass run channel is known.

Figure 10:
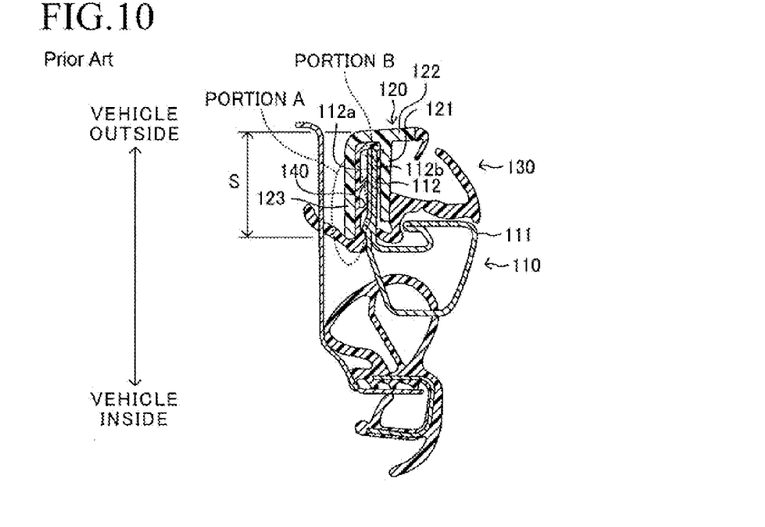
FIG. 10 is a cross-sectional view illustrating a conventional door frame assembly.

This type of door frame assembly extends from the upper end of a door panel of the vehicle. FIG. 10 is a cross-sectional view illustrating a door frame assembly disclosed in JP2010-18130 A from the direction that is perpendicular to the direction in which the door frame assembly extends. As shown in FIG. 10, the door frame assembly includes: a door frame 110; a molding portion 120 attached to the door frame 110; and a glass run channel 130 attached to the molding portion 120.

The door frame 110 is formed by bending a plate-shaped member that is made of a metal. The door frame 110 includes a main frame portion 111 and a flange portion 112. The main frame portion 111 is formed by bending a plate-shaped member that is made of a metal, into a column shape along the direction in which the door frame assembly extends. The cross-sectional shape of the main frame portion 111 is, as shown in FIG. 10, a hollow, closed circle. The flange portion 112 is formed continuing from the main frame portion 111 so as to protrude from the main frame portion 111 toward the vehicle outer side. The flange portion 112 includes a first flange portion 112a configured of one end portion of the plate-shaped member made of metal and a second flange portion 112b configured of the other end portion of the plate-shaped member. The flange portion 112 is formed along the direction in which the door frame assembly extends so that the first flange portion 112a and the second flange portion 112b overlap with each other.

The molding portion 120 is configured of a hard resin, and is attached to the flange portion 112. The molding portion 120 includes a first side wall portion 121 disposed so as to face the entirety of the second flange portion 112b, a second side wall portion 122 connected to a vehicle outer end of the first side wall portion 121, and a third side wall portion 123 connected to the second side wall portion 122 and disposed so as to face the entirety of the first flange portion 112a. The molding portion 120 is formed along the direction in which the door frame assembly extends so as to cover the flange portion 112. The glass run channel 130, which is configured of a flexible resin, is attached to the molding portion 120. Furthermore, a sealing lip 140 is attached to the surface of the third side wall portion 123 of the molding portion 120 that opposes the first flange portion 112a. The sealing lip 140 is formed along the direction in which the door frame assembly extends, and a tip portion thereof makes contact with the first flange portion 112a. The sealing lip 140 prevents foreign objects (raindrops or the like) from the outside from entering into the space between the first side wall portion 121 of the molding portion 120 and the second flange portion 112b.

Figure 11:
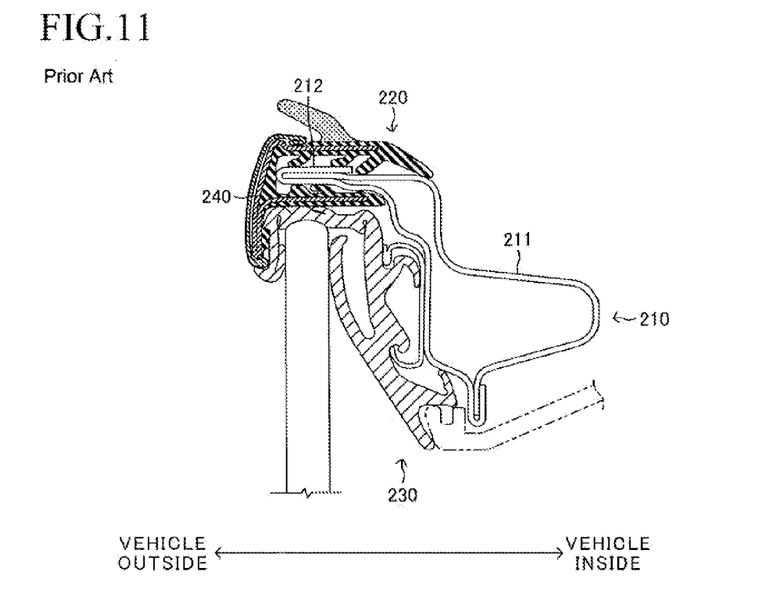
FIG. 11 is a cross-sectional view illustrating another conventional door frame assembly.

As shown in FIG. 11, the door frame assembly disclosed in JP2006-51906A also includes: a door frame 210 in which a column-shaped main frame portion 211 and a flange portion 212 that protrudes toward the vehicle outer side from the main frame portion 211 are formed; a molding portion 220, made from a hard resin, that is attached to the flange portion 212 of the door frame 210; and a glass run channel 230, made from a flexible resin, that is attached to the molding portion 220. A core member 240, made from a metal, is provided within the molding portion 220.

According to the door frame assembly disclosed in JP2010-18130 A, the molding portion 120 configured of a hard resin is formed across a wide region. Due to the hardness of the hard resin, it is necessary to have a large bending force when bending the molding portion configured of a hard resin. Accordingly, in the case where the door frame assembly is bent, it is difficult to precisely bend the molding portion so as to follow the shape of the door frame assembly. In particular, the vertical door frame assembly provided along a vertical edge portion (an edge formed along the vertical direction) of an opening in the vehicle door which is covered by a slidable window glass curves so as to incline from the vehicle outer side toward the vehicle inner side as the vertical door frame assembly extends toward an upper side. Accordingly, in the case where the door frame assembly shown in FIG. 10 is to be applied in a vertical door frame assembly, it is necessary to bend the molding portion 120 from the vehicle outer side toward the vehicle inner side. At this time, a greater bending force is required as the width of the molding portion 120 which represents the length from the vehicle outer side end of the molding portion 120 to the vehicle inner side end of the molding portion 120 is greater. The greater the required bending force, the more difficult it is to bend the molding portion 120 in a precise manner (or, the molding portion 120 simply does not bend).

It is considered to cut out part of a molding portion configured of a hard resin in order to reduce the necessary bending force. The cutout portion of the hard resin is, for example, the region indicated by "PORTION A" in FIG. 10, which does not include the location where the glass run channel is formed. Cutting out the region indicated by "PORTION A" reduces a width S of the third side wall portion 123. The width S represents the length from the vehicle outer side end of the third side wall portion 123 to the vehicle inner side end of the third side wall portion 123 of the molding portion 120. Thus, the bending force required when bending the molding portion 120 from the vehicle outer side toward the vehicle inner side is reduced. However, in the case where the region indicated by "PORTION A" is cut out, the sealing lip 140 is also cut out. If the sealing lip 140 is cut out, raindrops or the like enter from the cutout, and the raindrops that have entered land on an cut end of the door frame 110 (the location indicated as "PORTION B" in FIG. 10). It is highly unlikely that a rust inhibitor has been applied to the cut end of the door frame 110, and thus this area will rust due to the raindrops that have landed thereon.

The same problem, which is rusting, can also arise in the door frame assembly disclosed in JP2006-51906A. Furthermore, the core member 240, made from a metal, is provided within the molding portion 220. This leads to increases in the weight and the material costs thereof. Furthermore, in the case where the door frame assembly disclosed in JP2006-51906A is applied in a curved door frame assembly, it is necessary to bend the core provided in the molding portion 220 in advance. This leads to an increase in manufacturing costs.

Thus, a need exists for a door frame assembly which is not susceptible to the drawback mentioned above.

SUMMARY

The present invention provides a door frame assembly that extends upward from a door panel of a vehicle while curving. This door frame assembly includes a door frame, a molding portion, a glass run channel, and a sealing lip. The door frame has a main frame portion formed along the extension direction of the door frame assembly into a column shape by bending a portion that follows on one end portion of a plate-shaped member and a flange portion formed along the extension direction of the door frame assembly and protruding toward a vehicle outer side from the main frame portion. The flange portion has a first flange portion formed by bending a portion of the plate-shaped member that follows on the main frame portion so as to protrude toward the vehicle outer side from the main frame portion, and a second flange portion formed by bending back a portion of the plate-shaped member that follows on the first flange portion so as to enclose the one end portion of the plate-shaped member between the first flange portion and the second flange portion. The molding portion has a first side wall portion formed along the extension direction of the door frame assembly so as to be disposed opposite to the second flange portion, a second side wall portion connected to a vehicle outer side end of the first side wall portion and formed along the extension direction of the door frame assembly, a third side wall portion connected to the second side wall portion and formed along the extension direction of the door frame assembly so as to be disposed opposite to a vehicle outer side portion of the first flange portion, and an engagement portion connected to the third side wall portion that engages with the flange portion. The molding portion is configured so that the flange portion is covered by the first side wall portion, the second side wall portion, and the third side wall portion from the vehicle outer side. The glass run channel has an inner wall portion connected to a vehicle inner side end of the first side wall portion and formed along the extension direction of the door frame assembly so as to be disposed opposite to the main frame portion, a vehicle inner-side lip portion formed along the extension direction of the door frame assembly so as to protrude from the inner wall portion toward the vehicle outer side, and a vehicle outer-side lip portion connected to the second side wall portion and formed along the extension direction of the door frame assembly so as to be disposed opposite to the vehicle inner-side lip portion and to protrude from the second side wall portion toward the vehicle inner side. The glass run channel guides a sliding movement of a window glass attached to the door panel slidably so as to extend from and retract into the door panel. The sealing lip is formed along the extension direction of the door frame assembly so as to protrude from the surface of the first side wall portion that opposes the second flange portion. The sealing portion is provided for preventing a foreign object from entering into a space between the second flange portion and the first side wall portion from a space between the first flange portion and the third side wall portion by making contact with the second flange portion. The other end portion of the plate-shaped member that follows on the portion of which the second flange portion is formed is located between the inner wall portion of the glass run channel and a portion of the main frame portion that faces the inner wall portion, and the engagement portion is partially connected to the third side wall portion at multiple locations along the extension direction of the door frame assembly.

With the door frame assembly according to the present invention, the third side wall portion of the molding portion configured so as to cover the flange portion from the vehicle outer side is disposed opposite to a vehicle outer side portion of the first flange portion. In other words, the third side wall portion is disposed opposite to the outer side portion of the first flange portion, but is not disposed opposite to a the inner side portion of the first flange portion. That is, the third side wall portion according to the present invention is formed so that the width thereof (that is, the length from the vehicle outer side end of the third side wall to the vehicle inner side end of the third side wall portion) is smaller than the case where the third side wall portion is disposed opposite to the entire surface of the first flange portion.

Further, the engagement portion of the molding portion engages with the flange portion so that the molding portion connects to the flange portion. The engagement portion is partially (that is, intermittently) provided on the third side wall portion at multiple locations along the direction in which the door frame assembly extends. Thus, the region in which the molding portion is formed is reduced as compared to the conventional assembly shown in FIG. 10, which corresponds to a case where the engagement portion is formed continuously across the entire direction in which the door frame assembly extends, or in other words, across the longitudinal direction of the third side wall portion. Reducing the region in which the molding portion is formed results the reduction of the deformation amount of the molding portion when the molding portion is bent. Accordingly, resistance to the bending force generated when the molding portion deforms is also reduced. Reducing the resistance also reduces the required bending force.

In this manner, the required bending force is reduced by reducing the resistance generated when the molding portion is bent (that is, reducing the resistance to the bending force). Reducing the required bending force makes it possible to bend the molding portion precisely along the curved shape of the door frame assembly.

In addition, the sealing lip is provided on the surface of the first side wall portion of the molding portion that opposes the second flange portion. Furthermore, the glass run channel is provided in the first side wall portion and the second side wall portion of the molding portion. Accordingly, even if the width of the third side wall portion of the molding portion is formed shorter, the sealing lip, the glass run channel, or the like are not eliminated as a result thereof.

Additionally, the one end portion of the single metal plate-shaped member is enclosed by the first flange portion and the second flange portion. Accordingly, foreign objects (raindrops or the like) do not land on the one end portion. Further, the sealing lip provided in the first side wall portion of the molding portion makes contact with the second flange portion, and thus foreign objects such as raindrops are prevented from entering into the space in which the second flange portion is disposed from the exterior (that is, from the space between the third side wall portion and the first flange portion). Accordingly, raindrops or the like do not land on the other side of the plate-shaped member that follows on the second flange portion. In this manner, raindrops are prevented from entering toward both ends of the metal plate-shaped member that forms the door frame. Therefore, rusting caused by raindrops landing on the ends of the plate-shaped member is prevented.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
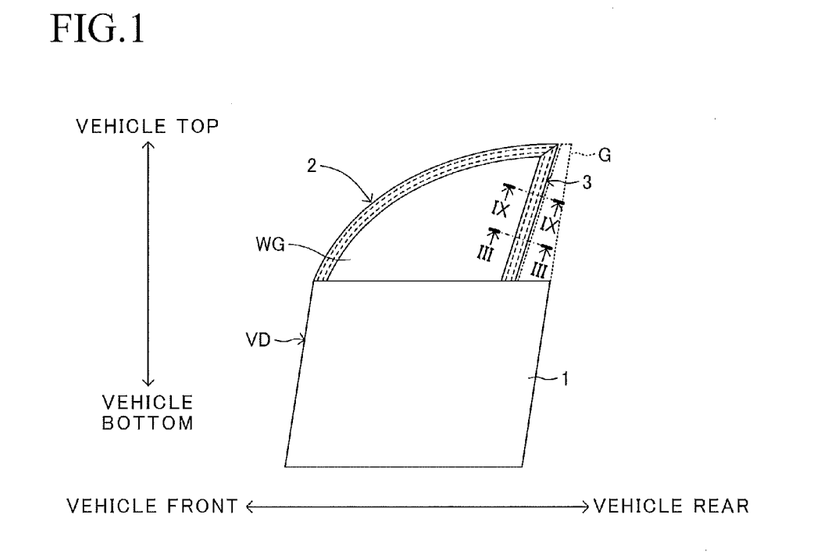
FIG. 1 is a diagram schematically illustrating a vehicle door VD provided with a door frame assembly according to an embodiment.

Hereinafter, embodiments will be described. FIG. 1 is a diagram schematically illustrating a vehicle door VD provided with a door frame assembly according to the present embodiment. As shown in FIG. 1, the vehicle door VD includes a door panel 1, an upper door frame assembly 2, and a vertical door frame assembly 3. The vehicle front side end of the upper door frame assembly 2 is connected to the vehicle front side end of the door panel 1, and extends upward from the connection portion while bending toward the vehicle rear side. Meanwhile, the lower end of the vertical door frame assembly 3 is connected to a vehicle rear side of the door panel 1, and extends upward from the connection portion. Then, the vehicle rear side end of the upper door frame assembly 2 is connected to the upper side end of the vertical door frame assembly 3. Accordingly, as shown in FIG. 1, a fan-shaped opening defined by the door panel 1, the upper door frame assembly 2, and the vertical door frame assembly 3 is formed in the vehicle door VD. This opening is covered by a window glass WG that is attached to the door panel 1. The window glass WG is attached to the door panel 1 so as to be capable of extending from/retracting into the door panel 1. The vertical door frame assembly 3 configures the vertical edge portion of this opening.

Figure 2:
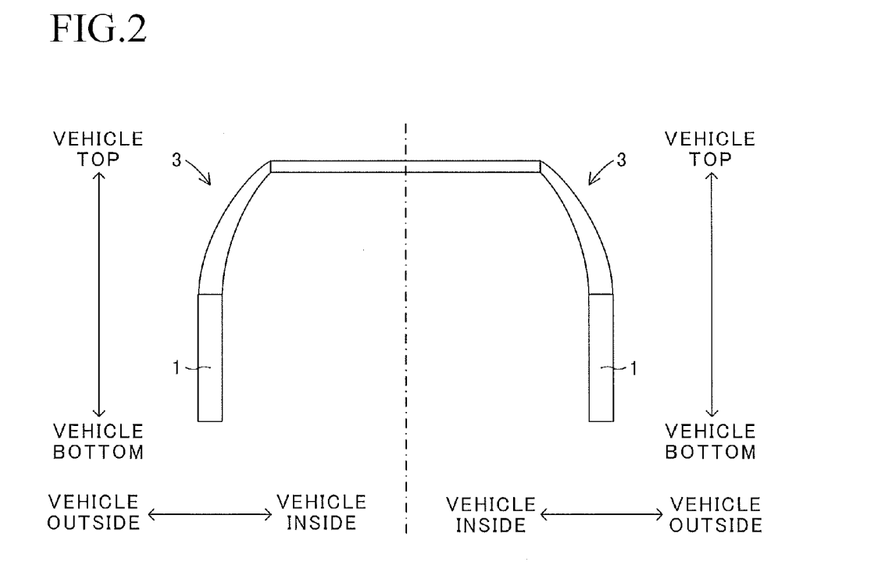
FIG. 2 is a schematic diagram illustrating a vertical door frame assembly seen from the vehicle front side.

FIG. 2 is a schematic diagram illustrating the vertical door frame assembly 3 seen from the vehicle front side. As shown in FIG. 2, the vertical door frame assembly 3 extends from the door panel 1 toward the vehicle upside, and bends from the vehicle outer side toward the vehicle inner side as the assembly extends upward.

Figure 3:
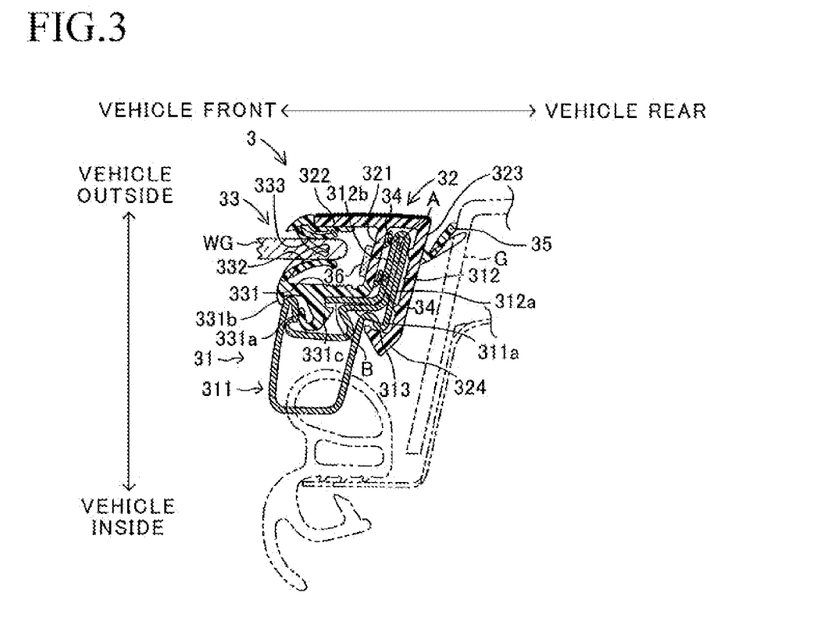
FIG. 3 is a cross-section view taken along the III-III line shown in FIG. 1.

FIG. 3 is a cross-sectional view taken along the III-III line shown in FIG. 1, or in other words, is a cross-sectional view cutting the vertical door frame 3 along a plane perpendicular to the extending direction of the vertical door frame assembly 3. As shown in FIG. 3, the vertical door frame assembly 3 includes a door frame 31, a molding portion 32, a glass run channel 33, and a sealing lip 34. The molding portion 32 is attached to the door frame 31. The glass run channel 33 and sealing lip 34 are attached to the molding portion 32. In other words, in the vertical door frame assembly 3 according to the present embodiment, a glass run channel-integrated molding is attached to the door frame 31.

First, the shape of the door frame 31 will be described. The door frame 31 includes a main frame portion 311 and a flange portion 312. The main frame portion 311 is formed as a column shape, and curved along the extending direction of the vertical door frame assembly 3. The cross-sectional shape of the main frame portion 311 cut along a plane perpendicular to the extension direction thereof is, as shown in FIG. 3, an approximately quadrangular shape having an interior space. In other words, the main frame portion 311 is formed in a column shape, in which an approximately quadrangular inner space is formed, and so as to curve in the longitudinal direction.

Figure 4:
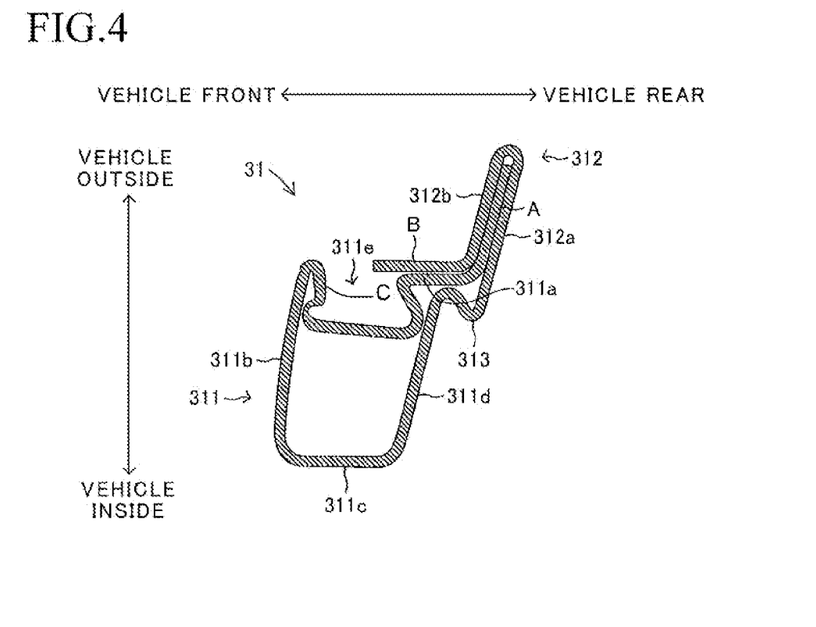
FIG. 4 is a cross-sectional view illustrating a door frame shown in FIG. 3.

FIG. 4 is a cross-sectional view illustrating the door frame 31 shown in FIG. 3. As shown in FIG. 4, a first recess 311e that is recessed toward the vehicle inner side is formed in a vehicle outer-side main frame portion 311a, which forms a vehicle outer side portion of the main frame portion 311.

The flange portion 312 is formed from the vehicle rear side of the vehicle outer-side main frame portion 311a so as to protrude toward the vehicle outer side. The flange portion 312 includes a first flange portion 312a and a second flange portion 312b that are disposed so as to oppose each other. The first flange portion 312a and the second flange portion 312b are formed longitudinally along the extending direction of the vertical door frame assembly 3.

The main frame portion 311 and the flange portion 312 are formed in an integral manner by bending a single plate-shaped member that is made of a metal. The manner for bending the plate-shaped member so as to form the main frame portion 311 and the flange portion 312 will be described next based on the cross-sectional views shown in FIG. 3 and FIG. 4. First, a first end portion A (see FIG. 4), which is one end portion of the plate-shaped member shown in the cross-section of the door frame 31 that is viewed from the plane perpendicular to the direction in which the vertical door frame assembly 3 extends, is disposed so as to face to the front-to-rear direction of the vehicle, and a portion of the plate-shaped member that follows on the first end portion A is bent toward the vehicle front side, as shown in FIG. 4. A part of the bended portion forms the vehicle outer-side main frame portion 311a, which configures the portion of the main frame portion 311 that is located at the vehicle outer side. As mentioned above, the first recess 311e is formed in the vehicle outer side main frame 311a by bending the vehicle outer side main frame 311a so as to recess toward the inner side of the vehicle.

Furthermore, a vehicle front-side main frame portion 311b, which configures the portion of the main frame portion 311 that is located at the vehicle front side, is formed by bending a portion of the plate-shaped member that follows on the vehicle front end of the vehicle outer-side main frame portion 311a toward the vehicle inner side. Furthermore, a vehicle inner-side main frame portion 311c, which configures the portion of the main frame portion 311 that is located at the vehicle inner side, is formed by bending a portion of the plate-shaped member that follows on the vehicle inner side end of the vehicle front-side main frame portion 311b toward the vehicle rear side. Furthermore, a vehicle rear-side main frame portion 311d, which configures the portion of the main frame portion 311 that is located at the vehicle rear side, is formed by bending a portion of the plate-shaped member that follows on the vehicle rear side end of the vehicle inner-side main frame portion 311c toward the vehicle outer side. An inner space whose cross-section is approximately quadrangular is defined by the vehicle outer-side main frame portion 311a, the vehicle front-side main frame portion 311b, the vehicle inner-side main frame portion 311c, and the vehicle rear-side main frame portion 311d that are connected to each other as described above. In this manner, the column-shaped main frame portion 311 is formed along the direction in which the vertical door frame assembly 3 extends, by bending the portions of the plate-shaped member that continue from the first end portion A.

The portion of the plate-shaped member that follows on the vehicle outer side end of the vehicle rear-side main frame portion 311d is bent back toward the inner side of the vehicle, and the portion that follows on the bent-back portion is further bent back toward the vehicle outer side. A protrusion 313 that protrudes toward the inner side of the vehicle is formed by this bending back, as shown in FIG. 4.

The first flange portion 312a is formed by a portion that extends toward the vehicle outer side from the protrusion 313. The first flange portion 312a extends toward the vehicle outer side along the surface of the first end portion A that faces toward the vehicle rear side, as shown in FIG. 4. The portion of the plate-shaped member that follows on the vehicle outer side end of the first flange portion 312a is bent back toward the vehicle inner side. The second flange portion 312b is formed by the portion that is bent back toward the vehicle inner side. As shown in FIG. 4, the second flange portion 312b extends toward the vehicle inner side along the surface of the first end portion A that faces toward the vehicle front side. That is, the second flange portion 312b is bent back toward the vehicle inner side so that the second flange portion 312b and the first flange portion 312a enclose the first end portion A from the vehicle outer side. Accordingly, the first end portion A is sandwiched between the first flange portion 312a and the second flange portion 312b. In this manner, the flange portion 312 is configured as a laminate member having three layers made from the first flange portion 312a, the first end portion A, and the second flange portion 312b.

The portion of the plate-shaped member that follows on the vehicle inner side end of the second flange portion 312b is bent toward the vehicle front side to form a second end portion B. The second end portion B extends along the vehicle outer-side main frame portion 311a. In this manner, the door frame 31 is formed by bending a single plate-shaped member made of a metal.

Figure 5:
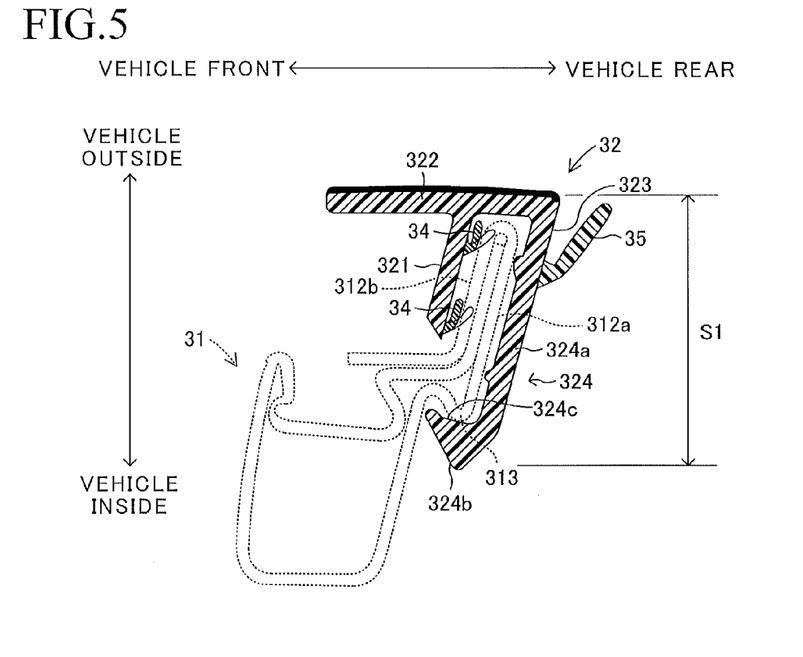
FIG. 5 is a cross-sectional view illustrating a molding portion shown in FIG. 3.

Next, the shape of the molding portion 32 will be described. FIG. 5 is a cross-sectional view illustrating the molding portion 32 shown in FIG. 3. Note that in FIG. 5, the door frame 31 is indicated by a dotted line. The molding portion 32 includes a first side wall portion 321, a second side wall portion 322, a third side wall portion 323, and an engagement portion 324, which are formed integrally. The molding portion 32 is made by a hard resin such as polypropylene resin.

The first side wall portion 321 is formed having a long shape along the direction in which the vertical door frame assembly 3 extends, so as to oppose the surface of the second flange portion 312b that faces toward the vehicle front side. The second side wall portion 322 is connected to the vehicle outer side end of the first side wall portion 321.

Like the first side wall portion 321, the second side wall portion 322 is formed having a long shape along the direction in which the vertical door frame assembly 3 extends. In the cross-sectional view shown in FIG. 5, the second side wall portion 322 extends along the front-to-rear direction of the vehicle, and is connected to the vehicle outer side end of the first side wall portion 321 at approximately the middle of the second side wall portion 322 in the front-to-rear direction of the vehicle. Thus, as clearly shown in FIG. 5, the first side wall portion 321 and the second side wall portion 322 form a cross-sectional T shape. The second side wall portion 322 has a surface that faces toward the vehicle outer side and a surface that faces toward the vehicle inner side. A decoration treatment may be carried out on the surface of the second side wall portion 322 that faces toward the vehicle outer side in order to improve the appearance thereof.

The third side wall portion 323 is connected to the vehicle rear side end of the second side wall portion 322. The third side wall portion 323 is formed along the direction in which the vertical door frame assembly 3 extends. As can be seen from FIG. 5, the third side wall portion 323 extends toward the vehicle inner side from the portion connected with the second side wall portion 322, and opposes a vehicle outer side portion of the surface of the first flange portion 312a that faces toward the vehicle rear side. Accordingly, the flange portion 312 is covered from the vehicle outer side by the first side wall portion 321, the second side wall portion 322, and the third side wall portion 323.

When the vehicle door VD is closed, a garnish (a B pillar garnish) G connected to the vehicle body (a B pillar) is disposed at the vehicle rear side of the third side wall portion 323, as shown in FIG. 3. A body sealing lip 35 is provided so as to protrude from the surface of the third side wall portion 323 that faces the garnish G. The body sealing lip 35 makes contact with the garnish G when the vehicle door VD is closed. The contact between the body sealing lip 35 and the garnish G reduces noise within the vehicle cabin and repels water to a small degree.

The engagement portion 324 is connected to the third side wall portion 323. The engagement portion 324 is disposed so as to oppose a vehicle inner side portion of the surface of the first flange portion 312a that faces the vehicle rear side. As shown in FIG. 5, the engagement portion 324 includes an arm portion 324a that extends from the connected portion with the third side wall portion 323 toward the vehicle inner side and a tip portion 324b that extends toward the vehicle front side from the vehicle inner side end of the arm portion 324a. An engagement surface 324c formed in the tip portion 324b engages with the protrusion 313 that protrudes toward the vehicle inner side from the vehicle inner side end of the first flange portion 312a. The molding portion 32 interlocks with the door frame 31 through the engagement between the engagement surface 324c and the protrusion 313. The engagement portion 324 is partially connected to the third side wall portion 323 at multiple locations along the direction in which the vertical door frame assembly 3 extends.

Figure 7:
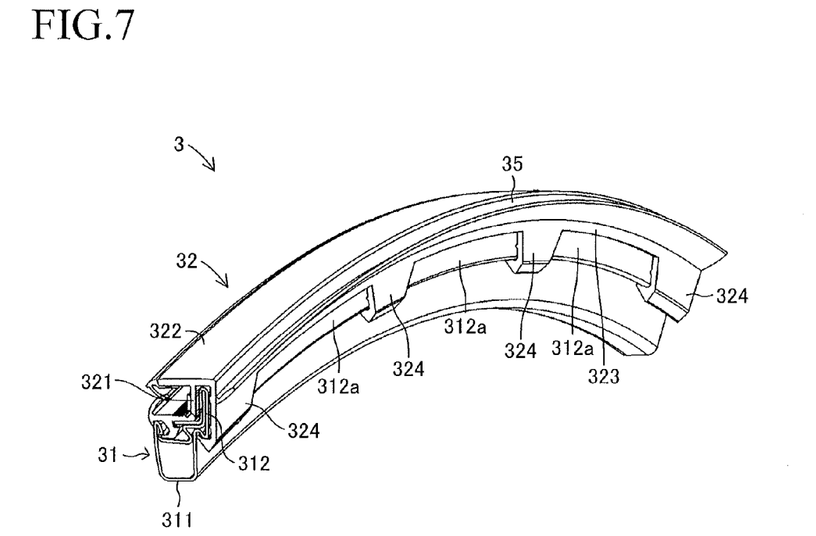
FIG. 7 is a perspective view illustrating a door frame assembly according to an embodiment.
Figure 8:
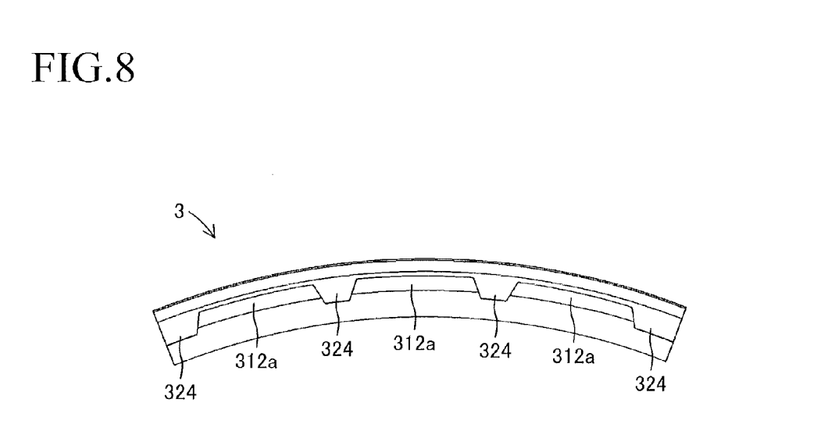
FIG. 8 is a diagram illustrating the door frame according to an embodiment seen from the outer side of the vehicle.

FIG. 7 is a perspective view illustrating the vertical door frame assembly 3 according to the present embodiment, whereas FIG. 8 is a diagram viewing the vertical door frame assembly 3 seen from the rear side of the vehicle. As shown in these diagrams, multiple (in the present embodiment, four) engagement portions 324 are partially connected to the third side wall portion 323 at multiple locations provided at predetermined intervals along the direction in which the vertical door frame assembly 3 extends.

Figure 9:
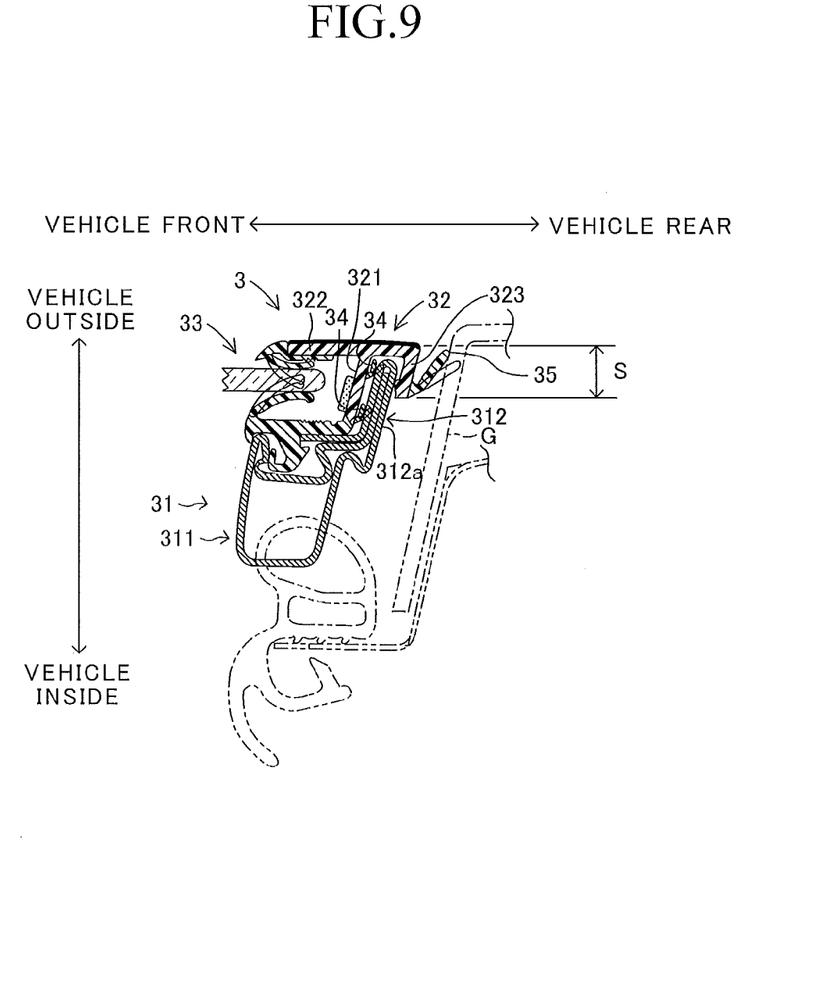
FIG. 9 is a cross-section view taken along the IX-IX line shown in FIG. 1.

FIG. 9 is a cross-section view taken along the IX-IX line shown in FIG. 1. The engagement portion 324 does not appear in this cross-sectional view. As can be seen from FIG. 9, the third side wall portion 323 of the molding portion 32 is disposed so as to oppose a vehicle outer side portion of the surface of the first flange portion 312a. That is, the third side wall portion 323 according to the present embodiment is formed so that the length (width) S from the vehicle outer side end to the vehicle inner side end is smaller than the case where the third side wall portion 323 is formed so as to oppose the entire surface of the first flange portion 312a.

As can be seen from FIG. 3 and FIG. 5, the sealing lip 34, which is made from a flexible resin, is attached to the first side wall portion 321. In the present embodiment, the sealing lip 34 is attached to the first side wall portion 321 at two positions. One position is located toward the vehicle inner side and the other position is located toward the vehicle outer side. The sealing lip 34 is formed along the extending direction of the vertical door frame assembly 3, and protrudes from the surface of the first side wall portion 321 that opposes the second flange portion 312b to make contact with the surface of the second flange portion 312b. Foreign objects are prevented from entering into the space between the second flange portion 312b and the first side wall portion 321 from the space between the first flange portion 312a and the third side wall portion 323 by virtue of contact between the sealing lip 34 and the second flange portion 312b. In addition, the engagement portion 324 is pushed against the first flange portion 312a by the elastic force arising when the sealing lip 34 elastically engages with the second flange portion 312b, which increases the engagement force between the flange portion 312 and the molding portion 32.

Figure 6:
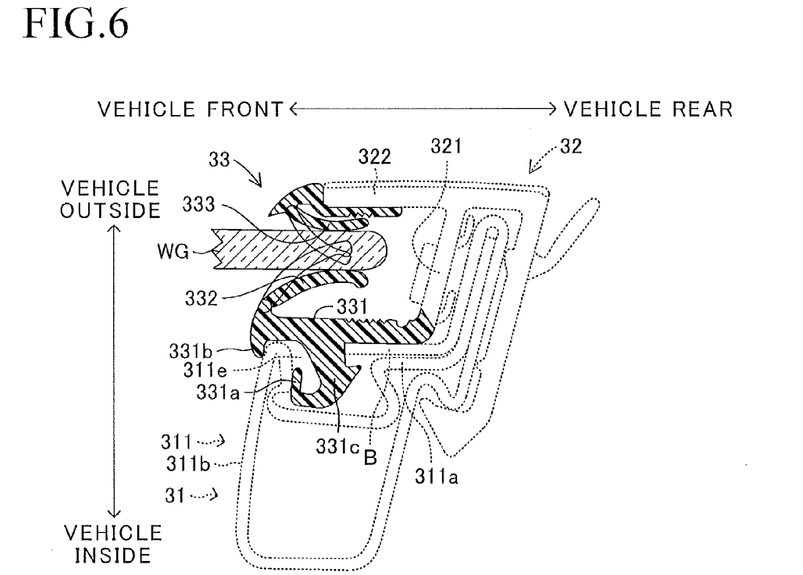
FIG. 6 is a cross-sectional view illustrating a glass run channel shown in FIG. 3.

Next, the glass run channel 33 will be described. FIG. 6 is a cross-sectional view illustrating the glass run channel 33 shown in FIG. 3. Note that in FIG. 6, the door frame 31 and the molding portion 32 are indicated by dotted lines. In the present embodiment, the glass run channel 33 includes an inner wall portion 331, a vehicle inner-side lip portion 332, and a vehicle outer-side lip portion 333. The glass run channel 33 is formed of a flexible resin such as an olefin-based elastomer (TPO). The inner wall portion 331 is connected to the vehicle inner side end of the first side wall portion 321 of the molding portion 32 along the direction in which the vertical door frame assembly 3 extends. The inner wall portion 331 extends toward the vehicle front side from the portion connected with the first side wall portion 321, and is disposed so as to face the vehicle outer-side main frame portion 311a from the vehicle outer side. As can be seen from FIG. 6, the second end portion B of the plate-shaped member is positioned at an area between the inner wall portion 331 and the vehicle outer-side main frame portion 311a that faces the inner wall portion 331.

An interlocking leg portion 331c is formed from the inner wall portion 331. The interlocking leg portion 331c enters into the first recess 311e. The interlocking leg portion 331c makes contact with an end surface (tip) of the second end portion B at the vehicle rear side, and as a result, the inner wall portion 331 interlocks with the door frame 31. Furthermore, a reinforcing lip portion 331a is connected to the interlocking leg portion 331c. The reinforcing lip portion 331a is bent toward the vehicle outer side from the tip portion of the interlocking leg portion 331c, and elastically engages with a wall surface formed in the first recess 311e toward the vehicle front side. The vehicle rear side end of the interlocking leg portion 331c is pressed against the end surface of the second end portion B due to the elastic force of the reinforcing lip portion 331a, and as a result, the engagement force between the inner wall portion 331 and the door frame 31 is more increased.

The vehicle inner-side lip portion 332 is formed from the vehicle front side end of the inner wall portion 331. The vehicle inner-side lip portion 332 extends toward the vehicle outer side from the portion connected with the inner wall portion 331. A protruding portion 331b is formed in the vehicle front side end of the inner wall portion 331. The protruding portion 331b extends toward the vehicle inner side. The protruding portion 331b interlocks with the vehicle outer side end of the vehicle front-side main frame portion 311b. The inner wall portion 331 is anchored to the door frame 31 in a stable manner due to the interlocking leg portion 331c interlocking with the second end portion B and the protruding portion 331b interlocking with the main frame portion 311.

The vehicle outer-side lip portion 333 is connected to the vehicle front side end of the second side wall portion 322 of the molding portion 32. The vehicle outer-side lip portion 333 extends toward the vehicle inner side. The vehicle inner-side lip portion 332 and the vehicle outer-side lip portion 333 are provided in approximately the same position in the width direction (vehicle outer side-vehicle inner side direction) of the vehicle. Thus, the vehicle inner-side lip portion 332 and the vehicle outer-side lip portion 333 are disposed opposite to each other and facing each other. The window glass WG, which is attached to the door panel 1 slidably so as to extend from, or retract into the door panel 1, is provided so that the side edge area of the window glass WG travels between the vehicle inner-side lip portion 332 and the vehicle outer-side lip portion 333 when sliding. Accordingly, the tip of the vehicle inner-side lip portion 332 makes contact with the surface of the window glass WG that faces toward the vehicle inner side, and the tip of the vehicle outer-side lip portion 333 makes contact with the surface of the window glass WG that faces toward the vehicle outer side. Since the window glass WG moves slidable while the vehicle inner-side lip portion 332 and the vehicle outer-side lip portion 333 make contact with the respective surfaces of the window glass WG, the sliding movement of the window glass WG is guided.

As shown in FIG. 3, a slide member 36 is provided on the surface of the first side wall portion 321 of the molding portion 32 that faces toward the vehicle front side. The slide member 36 can make contact with the side edge of the window glass WG when the window glass WG moves. The window glass WG moves with making contact with the slide member 36 and thereby the sliding movement of the window glass WG is stabilized.

In the vertical door frame assembly 3 configured as described thus far, the second end portion B of the metal plate-shaped member that configures the door frame 31 is positioned between the inner wall portion 331 of the glass run channel 33 and the vehicle outer-side main frame portion 311a. The space in which the second end portion B is located is separated from the space between the first flange portion 312a and the third side wall portion 323 by the sealing lip 34. In other words, the sealing lip 34 is formed protruding from the surface of the first side wall portion 321 of the molding portion 32 that faces toward the vehicle rear side and makes contact with the second flange portion 312b, and thus foreign objects (for example, raindrops) are prevented from entering into the space between the first side wall portion 321 of the molding portion 32 and the second flange portion 312b opposite thereto from the space between the third side wall portion 323 of the molding portion 32 and the first flange portion 312a opposite thereto. Accordingly, even if, for example, raindrops enter from the gap between the garnish G and the third side wall portion 323, pass the body sealing lip 35, and enter into the space between the first flange portion 312a and the third side wall portion 323, the raindrops cannot enter into the space where the second end portion B that follows on the second flange portion 312b is located, due to the sealing lip 34.

Meanwhile, the first end portion A of the plate-shaped member that configures the door frame 31 is enclosed by the first flange portion 312a that extends from the main frame portion 311 toward the vehicle outer side, and the second flange portion 312b that is formed by bending back the portion of the plate-shaped member that follows on the vehicle outer side end of the first flange portion 312a toward the vehicle inner side. By virtue of this configuration, the first end portion A is positioned in a space on the surface of the second flange portion 312b opposite to the surface with which the sealing lip 34 makes contact. The space on the surface of the second flange portion 312b with which the sealing lip 34 makes contact is communicated with the space on the opposite side surface via the space in which the second end portion B is disposed. However, the space in which the second end portion B is disposed is configured to prevent foreign objects from entering as described above. Therefore, foreign objects such as raindrops do not enter into the space in which the first end portion A is disposed.

Usually, a rust inhibitor or the like is applied to both surfaces of the single metal plate-shaped member that configures the door frame 31, in order to prevent rusting. However, it is often the case that the rust inhibitor is not applied to the end surfaces (edge) of the plate-shaped member. When raindrops land on the end surfaces of the plate-shaped member to which the rust inhibitor has not been applied, the end surfaces of the plate-shaped member will rust. Such rusting will accelerate the degradation of the door frame 31.

However, with the vertical door frame assembly 3 according to the present embodiment, the first end portion A and the second end portion B of the plate-shaped member are both located within a space into which raindrops are prevented from entering by the sealing lip 34. Accordingly, it is possible to prevent rusting caused by raindrops or the like landing on the end surfaces of the door frame 31.

Incidentally, in the case where the molding portion of the curved door frame assembly is formed of a hard resin, it is necessary to have a large force to bend the molding portion along the curved shape of the door frame assembly. In particular, the vertical door frame assembly 3 is curved in the direction from the vehicle outer side toward the vehicle inner side. Therefore, if the length (width) from the vehicle outer side end of the molding portion 32 to the vehicle inner side end of the molding portion 32 is great, the molding portion 32 deforms greatly when the molding portion 32 is bent so as to follow the curved shape of the vertical door frame assembly 3. By the deformation of the molding portion 32, the elastic force is generated and that elastic force acts as resistance force against the bending force. Therefore, the required bending force is greater as the amount of deformation is greater. When the required bending force is great, the molding portion 32 cannot be bent precisely along the curved shape of the vertical door frame assembly 3.

In the case where the conventional door frame assembly shown in FIG. 10 is bent, the width of the bending portion (the width S in FIG. 10) is great, and thus a great bending force is required. If the third side wall portion 123, indicated by "PORTION A" in FIG. 10, is trimmed in order to reduce the required bending force, the body sealing lip and sealing lip 140 attached to that area indicated by "PORTION A" will also be removed, thus allowing raindrops and the like to enter from the outside; thereby the raindrops will land on the end surface of the door frame 110, which can instigate rusting.

As opposed to this, with the vertical door frame assembly 3 according to the present embodiment, the sealing lip 34 is provided between the first side wall portion 321 of the molding portion 32 and the second flange portion 312b. Furthermore, the glass run channel 33 is attached to the first side wall portion 321 and the second side wall portion 322 of the molding portion 32. Accordingly, the third side wall portion 323 may have only a function to mount the body sealing lip 35 and the engagement portion 324, and thus, as shown in FIG. 9, the width S of the third side wall portion 323 can be reduced.

Further, the engagement portions 324 connected to the third side wall portion 323 are, as shown in FIG. 7 and FIG. 8, partially provided in multiple locations along the lengthwise direction of the third side wall portion 323. Accordingly, the first flange portion 312a is exposed from the areas between adjacent engagement portions 324. Note that the combined length of the width of the third side wall portion 323 (that is, the length from the vehicle outer side end to the vehicle inner side end of the third side wall portion 323) and the width of the engagement portion 324 (that is, the length from the vehicle outer side end to the vehicle inner side end of the engagement portion 324) in the present embodiment (that is, a length S1 in FIG. 5) corresponds to the width S of the third side wall portion 123 of the molding portion 120 in the conventional door frame assembly shown in FIG. 10. Accordingly, the combined shape of the third side wall portion 323 and the engagement portion 324 of the molding portion 32 according to the present embodiment corresponds to a shape that would be obtained by trimming the third side wall portion 123 of the molding portion 120 in the conventional door frame assembly shown in FIG. 10 in multiple locations along the lengthwise direction. In other words, according to the present embodiment, the region in which the molding portion is formed is reduced by an amount equivalent to the portion that is trimmed as compared to the conventional door frame assembly.

As mentioned above, the region in which the molding portion is formed is reduced as compared to the conventional door frame assembly. Therefore, when the molding portion 32 is bent, the deformation amount of the molding portion 32 also reduces. In particular, according to the present embodiment, the width of the third side wall portion 323 (that is, the length from the vehicle outer side end to the vehicle inner side end of the third side wall portion 323) which is deformed greatly when the molding portion 32 is bent is shortened. Specifically, the width in the area where the engagement portions 324 are not formed (the width S in FIG. 9) is shortened. In this manner, the portion for generating the resistance force against the bending force is reduced and thereby the resistance force by the deformation of the molding portion 32 caused by the bending (that is, the resistance force against the bending force) is also reduced. Reducing the resistance also reduces the required bending force. Reducing the required bending force makes it possible to bend the molding portion 32 precisely along the curved shape in which the vertical door frame assembly 3 is bent.

Further, the protrusion 313 that protrudes toward the vehicle inner side is formed at the connected portion between the vehicle rear-side main frame portion 311d and the first flange portion 312a, and the tip portion 324b of the engagement portion 324 interlocks with the protrusion 313. The shape of the protrusion 313 is formed at a sharp angle relative to the engagement surface 324c of the tip portion 324b so that the tip portion 324b does not slip when the tip portion 324b is interlocked. Such a protrusion 313 makes it possible to achieve a sufficient interlocking force even in the case where the engagement portion 324 is only partially engaged with the door frame 31.

Furthermore, as can be seen from FIG. 5, the engagement surface 324c of the tip portion 324b in the engagement portion 324 is formed so as to slope toward the vehicle outer side. Forming the engagement surface 324c in this manner strengthens the force of the engagement with the protrusion 313, and prevents the tip portion 324b from slipping from the protrusion 313 when an external force acts on the molding portion 32 in the vehicle outer side direction, and thereby preventing the molding portion 32 from pulling out from the flange portion 312.

The invention claimed is:

1. A door frame assembly extending upward from a door panel of a vehicle, the door frame assembly comprising:
    a door frame including a main frame portion and a flange portion formed integrally by bending a plate-shaped member which has one end portion and an other end portion, the main frame portion formed along an extension direction of the door frame assembly into a column shape, the flange portion connected with the main frame portion, formed along the extension direction of the door frame assembly and protruding toward a vehicle outer side from the main frame portion, the flange portion having a first flange portion and a second flange portion, the first flange portion formed so as to protrude toward the vehicle outer side from the main frame portion, the second flange portion connected with the first flange portion and formed so as to enclose the one end portion of the plate-shaped member between the first flange portion and the second flange portion;
    a molded portion configured of a resin, the molded portion including a first side wall portion, a second side wall portion, a third side wall portion, and an engagement portion, the first side wall portion formed along the extension direction of the door frame assembly so as to be disposed opposite to the second flange portion, the second side wall portion connected to a vehicle outer side end of the first side wall portion and formed along the extension direction of the door frame assembly, the third side wall portion connected to the second side wall portion and formed along the extension direction of the door frame assembly so as to be disposed opposite to a vehicle outer side portion of the first flange portion, the engagement portion connected to the third side wall portion that engages with the flange portion, the molded portion configured so that the flange portion is covered by the first side wall portion, the second side wall portion, and the third side wall portion from the vehicle outer side;
    a glass run channel including an inner wall portion, a vehicle inner-side lip portion, and a vehicle outer-side lip portion, the inner wall portion connected to a vehicle inner side end of the first side wall portion and formed along the extension direction of the door frame assembly so as to be disposed opposite to the main frame portion, the vehicle inner-side lip portion formed along the extension direction of the door frame assembly so as to protrude from the inner wall portion toward the vehicle outer side, the vehicle outer-side lip portion connected to the second side wall portion and formed along the extension direction of the door frame assembly so as to be disposed opposite to the vehicle inner-side lip portion and to protrude from the second side wall portion toward the vehicle inner side, the glass run channel guiding a sliding movement of a window glass attached to the door panel slidably so as to extend from and retract into the door panel; and
    a sealing lip formed along the extension direction of the door frame assembly so as to protrude from a surface of the first side wall portion that opposes the second flange portion for preventing a foreign object from entering into a space between the second flange portion and the first side wall portion from a space between the first flange portion and the third side wall portion by making contact with the second flange portion,
    wherein the other end portion of the plate-shaped member is located between the inner wall portion of the glass run channel and a portion of the main frame portion that faces the inner wall portion;
    the engagement portion is partially connected to the third side wall portion at multiple locations along the extension direction of the door frame assembly,
    the glass run channel includes an interlocking leg portion formed integrally with the molded portion and extending away from the inner wall portion; and
    the inner wall portion interlocking with the door frame such that the interlocking leg portion contacts an end surface of the other end portion of the plate-shaped member.

2. The door frame assembly according to claim 1,
    wherein the main frame portion includes:
    a vehicle outer-side main frame portion forming a portion of the main frame portion located at vehicle outer side;
    a vehicle front-side main frame portion connected to a front side end of the vehicle outer-side main frame portion to form a portion of the main frame portion located at a vehicle front side;
    a vehicle inner-side main frame portion connected to a vehicle inner side end of the vehicle front-side main frame portion to form a portion of the main frame portion located at a vehicle inner side; and
    a vehicle rear-side main frame portion connected to a vehicle rear side end of the vehicle inner-side main frame portion to form a portion of the main frame portion located at a vehicle rear side.

3. The door frame assembly according to claim 2,
    wherein the first flange portion is connected to a vehicle outer side end of the vehicle rear-side main frame portion;
    the second flange portion is connected to the vehicle outer side end of the first flange portion so as to enclose the one end portion of the plate-shaped member between the first flange portion and the second flange portion; and
    the other end portion of the plate-shaped member is disposed between the inner wall portion of the glass run channel and the vehicle outer-side main frame portion.

4. The door frame assembly according to claim 3,
    wherein a protrusion is formed between the vehicle rear-side main frame portion and the first flange portion that protrudes toward the vehicle inner side; and
    the engagement portion engages with the protrusion.

5. The door frame assembly according to claim 3,
    wherein a first recess is formed in the vehicle outer-side main frame portion that is recessed toward the vehicle inner side;
    the interlocking leg portion enters into the first recess from the inner wall portion; and
    an engaging force with which the inner wall portion engages with the door frame is increased by an elastic force generated by the interlocking leg portion within the first recess.

6. The door frame assembly according to claim 5,
wherein the inner wall portion interlocks with the door frame by contacting a vehicle rear side end of the interlocking leg portion with the end surface of the other end portion of the plate-shaped member.

7. The door frame assembly according to claim 6,
wherein a reinforcing lip portion is connect to the interlocking leg portion; and
a vehicle rear end of the interlocking leg portion is pushed against the end surface of the other end portion of the plate-shaped member by an elastic force of the reinforcing lip generated by elastically engaging the reinforcing lip with a wall surface that forms vehicle front side wall of the first recess, and thereby the engaging force with which the inner wall portion engages with the door frame is increased.

8. The door frame assembly according to claim 1, wherein the end surface of the other end portion of the plate-shaped member contacted by the interlocking leg portion is a single layered portion of the plate-shaped member.

\* \* \* \* \*